R. H. GODDARD.
ROCKET APPARATUS.
APPLICATION FILED MAY 15, 1914.
1,103,503.
Patented July 14, 1914.
2 SHEETS—SHEET 2.
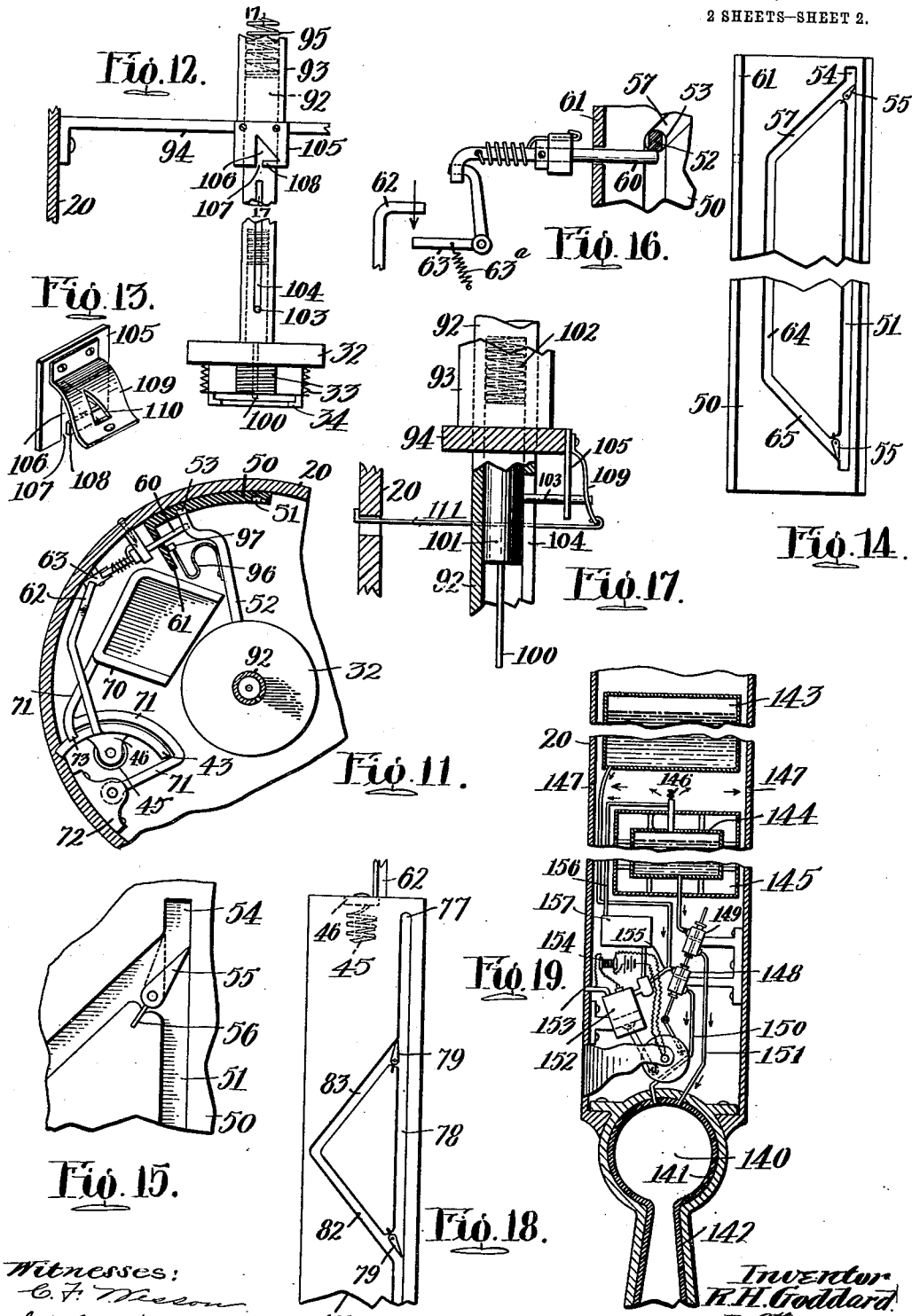
Witnesses:
C. F. Nelson
C. L. Hartnett
Inventor
R. H. Goddard
By attorneys
Southgate & Southgate

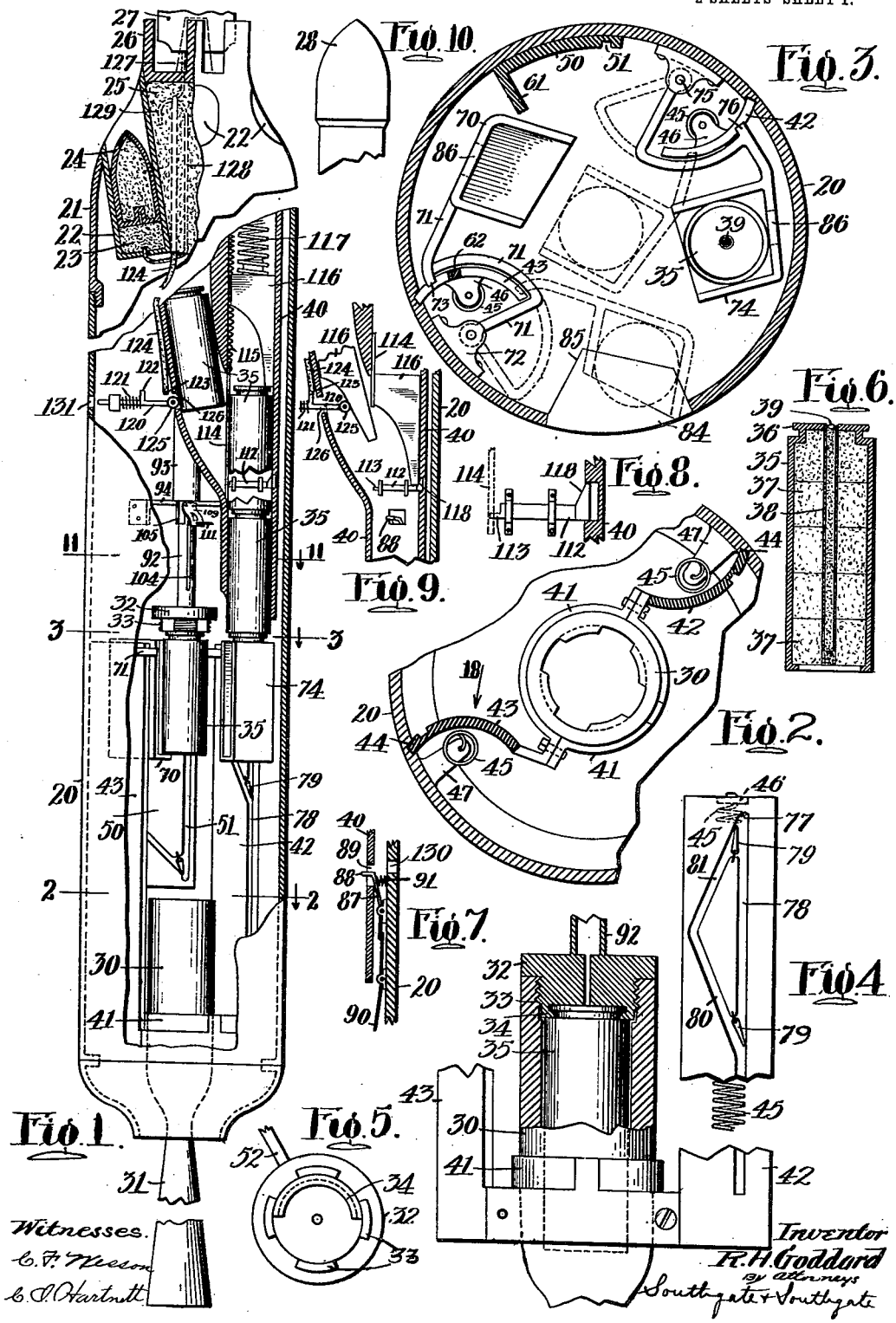

UNITED STATES PATENT OFFICE.

ROBERT H. GODDARD, OF WORCESTER, MASSACHUSETTS.

ROCKET APPARATUS.

1,103,503. Specification of Letters Patent. Patented July 14, 1914.

Application filed May 15, 1914. Serial No. 838,707.

*To all whom it may concern:*

Be it known that I, ROBERT H. GODDARD, a citizen of the United States, residing at Worcester, in the county of Worcester and State of Massachusetts, have invented a new and useful Rocket Apparatus, of which the following is a specification.

This invention relates to a rocket apparatus and particularly to a rocket apparatus adapted for carrying explosive signals, cameras, recording instruments or other devices to unusually high altitudes.

In all rocket apparatus a combustion chamber must be provided within which the propelling charge is ignited and consumed. As this charge is of an explosive nature, the walls of the chamber are necessarily thick and heavy and by their weight reduce the efficiency and limit the range of the apparatus. Furthermore, any increase in the propelling charge in a rocket of the ordinary type results in an increase in the size of the combustion chamber and a corresponding increase in the weight thereof.

It is one of the principal objects of my invention to provide means by which a large amount of propelling material may be carried and used in a rocket apparatus, while at the same time the weight of the apparatus is reduced rather than increased.

With this object in view the principal feature of my invention consists in the provision of a relatively small combustion chamber mounted within a light outer casing containing a reserve supply of propelling material and devices for renewing the charge in the combustion chamber as it is consumed.

In the preferred form of my invention the material is supplied in the form of separate cartridges which are successively inserted in the combustion chamber, said chamber having a breech block which is automatically withdrawn periodically to permit the insertion of a fresh cartridge. With this arrangement the mass of the propelling material forms a much larger proportion of the total mass of the rocket apparatus and the efficiency of the apparatus is thereby largely increased. When the apparatus is provided with the tapered rearwardly-extending nozzle described and claimed in my co-pending application, Serial No. 792,707, filed October 1, 1913, the efficiency of the apparatus as a whole is still further increased.

A rocket apparatus thus constructed may be used as a primary rocket, supporting a secondary rocket to be discharged when the material in the primary rocket becomes exhausted, as fully described in my application above referred to. The primary rocket may also be provided with one or more firing tubes for the discharge of projectiles of any desired character and may itself carry a charge of high explosive.

A further feature of my invention consists in the provision of means for successively igniting and discharging these several devices in proper sequence, their discharge ordinarily occurring as the primary rocket reaches the highest limit of its flight.

Various other features of my co-pending application, such as the means for producing rotation of the rocket, and the means for preventing rotation of the recording apparatus may be used in connection with the rocket apparatus herein described but form no part of my present invention.

My invention further consists in various devices, arrangements and combinations of parts which will be hereinafter described and more particularly pointed out in the appended claims.

A preferred form of my invention, together with a modification thereof, is shown in the drawings, in which—

Figure 1 is a longitudinal elevation partly in section of my improved device; Fig. 2 and 3 are transverse sectional views, taken along the lines 2—2 and 3—3 of Fig. 1; Fig. 4 is an elevation partly in section of the combustion chamber and certain parts movable therewith; Fig. 5 is a bottom plan view of the breech block; Fig. 6 is a longitudinal sectional view of one of the cartridges used in the preferred form of my device; Fig. 7 is a detail view showing the mechanism for retaining certain of the cartridges within the magazine tube during the loading operation. Fig. 8 is a detail view of the mechanism for opening a full magazine tube when the tube in use becomes exhausted; Fig. 9 is a detail view of the means for firing the secondary rocket when the last magazine tube is exhausted; Fig. 10 is a view of a cap which may be used in place of the secondary rocket; Fig. 11 is a partial sectional view taken along the line 11—11 in Fig. 1; Figs. 12 and 3 are detail views of the devices for firing the charge in the combustion chamber; Fig. 14 is an elevation, partially broken away, of the cam which controls the breech block; Fig. 15 is an enlarged detail of a portion of the cam shown in Fig. 14; Fig. 16 is an enlarged detail of the device for separating the breech block from the combustion chamber as the chamber moves rearwardly in the casing; Fig. 17 is a sectional elevation of the firing devices taken substantially along the line 17—17 of Fig. 12; Fig. 18 is an elevation of a part of the cam which controls the ejector, and Fig. 19 is a longitudinal sectional view showing a modified form of my invention.

Referring to Fig. 1 my invention is shown as inclosed within a thin light casing 20 to which is screwed a detachable head 21. This head may contain one or more firing tubes 22, each containing a charge 23 and a projectile 24 of any desired character. The head 21 may also contain a charge of high explosive indicated at 25 and may be provided at its upper end with extensions 26 for supporting a second rocket 27. This secondary rocket may be similar in all respects to the primary rocket or may be of any other desired character. Instead of the secondary rocket 27 the head 21 may be provided with the cap 28 shown in Fig. 10, which cap may carry recording apparatus, signaling devices, explosives, or any other similar devices. The means for successively firing the various devices carried by the head 21 will be hereinafter described.

The casing 20 incloses at its lower end a combustion chamber 30, (Figs. 1, 2 and 4) which may be provided with the rearwardly-extending tapered tube 31 through which the products of combustion are discharged. At its upper end the combustion chamber carries a breech block 32 which is normally locked within the chamber by sectional screw-threads 33 of the usual type. At its lower end the breech block carries an inwardly projecting flange 34 (Figs. 4 and 5) which extends half way around the breech block and provides means for supporting a cartridge 35 (Figs. 4 and 6) in position beneath the breech block. The cartridge 35 is provided with a flanged projection 36 which is adapted to coöperate with the flange 34. The propelling material in the cartridge 35 may be in the form of disks 37 having successively increasing rates of combustion as fully described in my co-pending application. A small tube 38 extends longitudinally through the cartridge and contains a rapidly burning material adapted to be ignited by the firing of a primer 39 mounted at the upper end of the tube 38. By this means the primer ignites the lowest disk 37 in the cartridge 35, and the combustion of the charge thereafter proceeds toward the upper end of the cartridge. The cartridges 35 are placed in one or more magazine tubes 40 (Fig. 1) within the casing 20.

I will now describe the devices by which a used cartridge is removed from the combustion chamber and a fresh cartridge is inserted therein. The combustion chamber 30 is not fixed within the casing 20 but is mounted for longitudinal movement therein. Referring now to Figs. 2 and 4 it will be seen that the lower end of the chamber 30 is secured between a pair of clamping bars 41, these bars being integral at their outer ends with cam plates 42 and 43, whose edges slide in grooves 44 (Fig. 2) in the casing 20. Spiral springs 45 have their upper ends secured to lugs 46 upon the cam plates 42 and 43, and at their lower ends are secured to lugs 47 upon the casing 20. As the cartridge 35 within the chamber 30 is ignited, the reaction of the propelling charge forces the combustion chamber, together with the cams 42 and 43 and the breech block 32, upward into the casing 20 against the yielding resistance of the springs 45. A curved cam plate 50 (Figs. 11 and 14) is secured to the side of the casing 20, the cam 50 having formed therein in any convenient manner a cam groove 51. The breech block 32 carries a laterally extending arm 52 (Fig. 11) which may be provided with a roll 53 upon its outer end located within the cam groove 51. As the combustion chamber and breech block travel upward relatively to the casing the roll 53 follows the straight vertical portion of the cam groove 51 shown to the right in Fig. 14. The breech block is thereby prevented from turning and is locked in the combustion chamber during its entire upward travel relatively to the casing and to the cam 50. It will be noted that the cam groove 51 has a short extension 54 at its upper end within which the roll 53 will be confined as the combustion chamber reaches its extreme upward limit. A switch-block 55 (Figs. 14 and 15) is normally held by a spring 56 in the position shown in Fig. 15. As the roller 53 passes upward the switch block is moved to the position shown in dotted lines in Fig. 15 but immediately resumes the position shown in full lines. Similar switch blocks are used as indicated at different places in the several cam plates. As the charge in the combustion chamber becomes exhausted the reaction of the expelled gases decreases until the chamber itself is eventually forced rearwardly by the springs 45. On its rearward movement the roll 53 is constrained by the switch block 55 to follow the inclined portion 57 of the cam plate 50. The combustion chamber, being clamped to the cams 42 and 43, is prevented from turning but the breech block is partially rotated relatively thereto by the portion 57 of the cam 50, the amount of rotation being sufficient to disengage the screw threads 33. As the roll 53 reaches the lower end of the inclined cam groove 57 the arm 52 (Figs. 11 and 16) engages a pin 60 mounted upon the casing and projecting through a hole in a flange 61 extending inwardly normal to the cam plate 50. Downward movement of the breech block is thus prevented, but as the sectional threads have been disengaged, the combustion chamber and the cam plates 42 and 43 continue their downward movement. The chamber and breech block are thus separated and the breech block remains in raised position until the combustion chamber approaches its lower or normal position.

The cam plate 43 mounted on the chamber 30 is provided at its upper end with an arm 62 (Figs. 11 and 16) extending longitudinally within the casing 20. At its upper end the arm 62 engages a bell crank 63 pivoted upon the casing, held in position by a coil spring 63ª and effective to withdraw the pin 60 from engagement with the breech arm 52. The roll 53 thereupon follows the portions 64 and 65 of the cam groove in the plate 50 and the breech block is thus inserted and locked within the combustion chamber. The engagement of the arm 62 with the bell crank 63 occurs before the chamber 30 reaches its extreme lower position so that the chamber and breech block may move downward together during the travel of the roll 53 along the lower inclined portion 65 of the cam plate 50 thus permitting the locking of the block within the chamber. When the chamber rises after the next explosion the arm 62 is carried upward past the crank 63 which is then moved to operative position below the arm 62 by the spring 63ª.

From the above description it will be seen that the combustion chamber continues its rearward travel during the time that the breech block is held in fixed raised position by the pin 60 and this rearward travel of the chamber is utilized to operate the ejecting and loading devices which renew the charge of propelling material.

Referring to Figs. 3 and 11, an ejector 70 is shown, supported upon a curved arm 71 pivotally mounted upon a bracket 72 secured to the casing 20. The arm 71 is so shaped that it partially encircles the cam plate 43 which is longitudinally movable in the combustion chamber. The arm 71 is provided with a projection 73 so disposed that it will follow the cam groove in the outer face of the cam 43 (Fig. 18). A substantially similar device 74 (Fig. 3) is pivotally mounted at 75 upon the casing 20 and has a projection 76 coöperating with the cam groove in the outer face of the cam plate 42 (Fig. 4). The normal position of the projections 73 and 76 is at the extreme upper end of the cam grooves at the point marked 77 in Figs. 4 and 18. As the cam plates move upwardly with the combustion chamber the projections 73 and 76 move downward relatively to the cams along the straight vertical portions 78. As the combustion chamber begins its rearward movement the projections return along the grooves 78 until they encounter the switch blocks 79 similar in all respects to those previously described. The projections are thereby shifted to the inclined portions of the cam grooves. The cam plates 42 and 43 are substantially similar in character with the exception that the cam 43 provides a greater lateral throw and that the inclined portions 82 and 83 thereof are nearer the lower end of the cam plate than the portions 80 and 81 of the plate 42. As the cam plates move downwardly, the projection 73 encounters the inclined groove 82 and the ejector 70 is thus moved from the full line position in Fig. 3 to the dotted line position. In its passage from one position to the other it moves under the suspended breech block and removes the exhausted cartridge shell, the shell being finally ejected through an opening 84 in the casing 20. An inwardly projecting lip 85 prevents the shell from falling backwardly into the casing. As the ejector is returning to its normal position, the projection 76 upon the loading device encounters the inclined portions 80 and 81 of the cam groove in the plate 42 and is thus swung forward to the dotted line position shown in Fig. 3. The loading device has been previously supplied with a fresh cartridge which is thus inserted beneath the breech block and is held suspended by the flange 34 thereon. Perforations 86 in the rear wall of the ejecting and loading devices prevent the cartridges from being retained by suction within said devices.

In order to prevent the cartridges from moving down in the magazine tube 40 while the loading device is inserting a cartridge in the breech block, I provide the retaining mechanism shown in Fig. 7. This mechanism comprises a latch 87 pivoted upon the casing 20 and having a projection 88 at its upper end adapted to extend through a perforation 89 in the side of the magazine tube 40. The projection 88 is so located longitudinally that it will engage the cartridge above the loading device beneath its flange 36 and will thus prevent the cartridge from moving downward in the magazine tube. As the loading device returns to its normal position it engages the lower end of a pivoted lever 90 (Fig. 7) said lever at its upper end engaging the lower end of the latch 87 and acting to withdraw the latch from the magazine tube. A coil spring 91 moves the latch into operative position whenever the loading device is moved forward to insert a cartridge in the breech block.

The breech block in its upward travel is guided by a tubular member 92 (Figs. 1 and 12) which projects upwardly from the breech block and slides freely within a sleeve 93 which is mounted upon a support 94 secured at its opposite ends to the casing 20. A compression spring 95 is contained within the sleeve 93 and exerts a downward pressure upon the upper end of the tubular member 92. As the breech block and combustion chamber move upwardly the pressure of the spring 95 increases and, conversely, as the breech block approaches its lower and normal position, the pressure of the spring 95 decreases. As the spring 95 constitutes the means for moving the roll 53 downward along the portions 57, 64 and 65 of the fixed cam 50, it will be evident that the force available for locking the breech block in the combustion chamber is much less than the force available for unlocking the block. In order to equalize this force I provide a spring arm 96 (Fig. 11) mounted upon the arm 52 and having a roll 97 upon its free end adapted to contact with the flange 61 of the cam plate 50. As the arm 52 moves to the left in descending along the portion 57 of the cam plate 50 the tension of the spring arm 96 will be increased, thus affording a reserve force which is available during the passage of the roll 53 along the portion 65 of the cam groove to supplement the decreasing pressure of the spring 95.

As previously stated, the cartridge 35 contains a primer 39 in its upper end and I will now describe the devices for exploding the primer and firing the charge within the combustion chamber. For this purpose I utilize a firing pin 100 (Fig. 17) secured to a cylindrical block 101 which is movable longitudinally within the tubular member 92. A coil spring 102 normally forces the block 101 toward the lower end of the member 92. A stud 103 extending laterally from the block 101 projects through a longitudinal slot 104 in the member 92. When this stud reaches the lower end of the slot it acts as a stop to prevent further downward movement of the block and firing pin. A latch plate 105 (Figs. 12, 13 and 17) is fixed to the support 94 and contains the substantially triangular recess 106 shown in Fig. 12. The stud 103 is normally at the lower end of the slot 104 and as the breech block rises with the combustion chamber the stud 103 also moves upwardly until it enters the recess 106 through the opening 107 in the lower edge of the plate 105. As the breech block is turned by the co-action of the roll 53 and the cam groove 57, the stud 103 is moved to a position overlying the projection 108 of the latch plate 105. The stud is held in this position as long as the breech block is unlocked and, as the breech block descends, the slot 104 permits the tubular member to move downward past the stud, the spring 102 (Fig. 17) being compressed by the block 101. As the breech block is returned to its original angular position and is locked within the combustion chamber, the stud 103 is moved off of the projection 108. When thus released, it passes downwardly through the opening 107 and along the slot 104 until the firing pin engages and explodes the primer 29 in the top of the cartridge 35. The operations just described take place after each automatic replenishing of the charge in the combustion chamber.

The firing of the first charge in the combustion chamber in starting the flight of the rocket requires a supplementary device comprising a spring plate 109 (Figs. 13 and 17) secured to the latch plate 105 and overlying the recess 106. When the breech block is raised to insert the first cartridge the stud 103 passes upward into a recess 110 in the spring plate 109. The plate 109 is then pulled inward by a rod 111 until the end of the rod projects through a hole in the casing. A lateral projection or hook at the end of the rod is adapted to engage the edge of the wall and hold the plate 109 in this position. The plate 109 in its normal or inoperative position does not interfere with the automatic operations of the latch plate 105 but when forced inward will engage and hold the stud 103 in its raised position. When it is thereafter desired to discharge the rocket, the hook upon the rod is pushed downward until it is disengaged from the casing after which the spring plate 109 returns to its normal or inoperative position and the stud 103 is released and is free to move downwardly as previously described. The operation of releasing the hook may be thus performed even after the rocket has been set in rapid axial rotation by the means described in my above mentioned application. The automatic reloading of the combustion chamber and the firing of the fresh cartridges continues as described until the magazine tube in use becomes exhausted. When this occurs, provision is made for throwing a second magazine tube into operative relation with the loading devices. This provision comprises a sliding bolt 112 (Figs. 1, 8 and 9) mounted to slide transversely near the lower end of the magazine tube 40. At its left hand end, as seen in the drawings, the bolt 112 has a lug 113 adapted to project into a perforation near the lower end of a sliding plate 114 which normally closes the opening between the first and second magazine tubes. A spring 115 (Fig. 1) acts to move the plate 114 upwardly whenever it is released by the withdrawal of the lug 113.

Each magazine tube is provided with a cartridge follower 116 which is forced downwardly against the cartridges by a coil spring 117 (Fig. 1). As the last cartridge in a particular tube is advanced to the loading device the follower 116 engages a beveled cam surface 118 (Figs. 8 and 9) upon the end of the bolt 112 and withdraws the lug 113 from the perforation in the plate 114. When thus released the plate moves upwardly under the influence of the spring 115 and the cartridges from the second magazine tube are thus permitted to pass to the loading device. When the cartridges in the second tube are exhausted additional magazine tubes may be similarly thrown into operation although for the sake of clearness I have shown only two magazine tubes in the drawings. It should be understood that the latch 112 is so disposed at the side of the magazine tube 40 that it does not interfere with the downward movement of the cartridges. As the last magazine tube becomes exhausted the devices for discharging the secondary rocket or explosive carried in the head 21 are brought into operation. These devices comprise a rod 120 (Figs. 1 and 9) mounted to slide transversely in bearings fixed to the casing 20. This rod is constantly forced to the right by a coil spring 121 (Fig. 1) and carries a projection 122 adapted to contact with a primer 123 mounted in the lower end of a tube 124. The rod 120 carries a roll 125 adapted to project through an opening 126 in the wall of the magazine tube and to contact with the cartridges in the tube. As the last cartridge is ejected the spring 121 forces the rod to the right thus causing the lug 122 to explode the primer 123. The tube 124 contains a fuse which is connected at its upper end with a series of supplementary fuses 127, 128 and 129. These fuses are so timed that the fuse 127 will operate first to discharge the secondary rocket. The fuse 128 will then explode the charge 23 in one or more firing tubes 22, thus expelling the projectiles 24. Last of all, the fuse 129 will ignite the high explosive 25 in the head of the primary rocket. Where a plurality of firing tubes are provided, these may be discharged simultaneously or successively between the discharge of the secondary rocket and the firing of the high explosive. By the proper timing of the fuses it is possible to distribute the destructive effect of the apparatus over a considerable portion of its travel.

In order to load the apparatus, the head 21 of the casing is unscrewed and removed, thus exposing the upper ends of the magazine tubes. A hook is inserted through an opening 130 (Fig. 7) in the casing 20 to withdraw the projection 88 and thus permit cartridges to pass to the lower end of the magazine tube 40. A similar hook is inserted through an opening 131 (Fig. 1) in the casing 20 to withdraw the sliding rod 120 so that the roller 125 may not interfere with the insertion of the cartridges. The sliding plates 114 are then pushed downwardly and locked in their lower position by the bolts 112. The magazine tubes are then filled from their upper ends after which the cartridge followers 116 and the springs 117 are inserted, the springs being retained in the tubes by any convenient means such as cross pins (not shown) inserted through perforations in the opposite sides of the tubes at their upper ends. The combustion chamber 30 may then be forced upward manually to operate the loading device to insert a cartridge in the chamber, the firing pin being retained in its upper position by the use of the spring plate 109 as previously described.

It should be understood that the secondary rocket may be provided with the complete mechanism thus far described upon a reduced scale and that the secondary rocket may carry a third rocket thereon, this procedure being repeated to any desired extent.

In Fig. 19 I have shown a modification in which the combustion is continuous rather than intermittent. In this form I provide a combustion chamber 140 having a refractory lining 141 and a rearwardly extending tapered tube 142 of the form previously described. Within the rocket casing I provide two tanks 143 and 144. These tanks contain materials which when ignited will produce an exceedingly rapid combustion. This result may be attained, for instance, by filling the tank 143 with gasolene and the tank 144 with liquified nitrous-oxid. As the latter substance is a liquid only at low temperatures it is necessary that this tank should be filled immediately before the discharge of the apparatus. In order to retain the low temperature of the liquid oxid I inclose the tank 144 within a second tank 145. The space between the tanks may be filled with a suitable non-conductor or may constitute a cellular vacuum casing as shown in the drawing. In order to prevent a dangerous rise of pressure in this tank from the evaporation which will inevitably occur I provide a safety valve 146, the discharge gases passing to the atmosphere through openings 147 in the casing 20. Force pumps 148 and 149 are connected respectively to the tanks 143 and 144 by the system of pipes shown in the drawings. On their discharge sides these pumps are connected by the pipes 150 and 151 to the combustion chamber 140. These force pumps may be of any preferred form and may be operated by any suitable mechanism. In the drawing I have shown the pumps as being piston-operated by a single sliding rod connected to a crank pin upon a rotating disk driven by a small gasolene engine 152. This engine is provided with the usual exhaust pipe 153 and ignition apparatus 154. Gasolene is supplied to the engine from the tank 143 through a branch pipe 155, and, in place of air, nitrous-oxid is supplied to the engine through a pipe 156, a storage tank 157 being provided between the tank 144 and the engine.

The operation of this device will be evident and it is not thought necessary to describe it in detail. It may be pointed out however that the force pumps 148 and 149 are so proportioned that the proper mixture of gasolene and nitrous-oxid will be at all times fed to the combustion chamber 140. In this form of the apparatus the combustion is continuous and the propelling force is therefore constant.

Having thus described my invention it will be plain that many changes and modifications can be made therein without departing from the spirit and scope of my invention as set forth in the claims, and I do not wish to be limited to the specific details herein disclosed, but

What I claim is:—

1. A rocket apparatus having, in combination, a combustion chamber, a casing containing a supply of combustible material, and means for successively feeding portions of said material to said combustion chamber.

2. A rocket apparatus having, in combination, a combustion chamber, a rearwardly extending tapered tube of substantial length connected with said chamber, a casing surrounding said chamber, a receptacle in said casing containing a supply of combustible material, and means for feeding said material to said chamber, said material being ignited within said chamber and the products of combustion being discharged through the tapered tube.

3. A rocket apparatus having, in combination, a combustion chamber, means for supplying a charge of combustible material thereto, and means for renewing the charge of combustible material within the combustion chamber.

4. A rocket apparatus having, in combination, a casing containing a plurality of cartridges, a combustion chamber, means for introducing said cartridges successively into said chamber, and means for firing each cartridge after it is placed in the combustion chamber.

5. A rocket apparatus having, in combination, a casing, a plurality of cartridges contained therein, a combustion chamber having a breech block, means for removing the breech block from said chamber, and means operable while said block is removed for introducing a fresh cartridge into said chamber.

6. A rocket apparatus having, in combination, a casing, a plurality of cartridges contained therein, a combustion chamber having a breech block, means for removing the breech block from said chamber, means for ejecting the used cartridge, and means for introducing a fresh cartridge into said chamber while said block is removed from the chamber.

7. A rocket apparatus having, in combination, a combustion chamber, a breech block normally locked in said chamber, means for unlocking said block and for relatively separating said chamber and block, an ejector for removing the used cartridge from the breech block, a loading device for inserting a fresh cartridge in said block, and means for thereafter locking said breech block in said combustion chamber.

8. A rocket apparatus having, in combination, a casing, a combustion chamber mounted for longitudinal movement in said casing, ejecting and loading devices mounted on said casing, and cams for operating said devices, said cams being supported on said combustion chamber and longitudinally movable therewith.

9. A rocket apparatus having, in combination, a casing, a combustion chamber longitudinally movable in said casing, a breech block normally locked in said chamber, and devices fixed to said casing effective to first unlock and separate said block and said chamber and to thereafter unite and lock said block in said chamber.

10. A rocket apparatus having, in combination, a casing, a combustion chamber longitudinally movable in said casing, said chamber having a breech block movable with said chamber in its upward travel relative to the casing, and means to separate said block and chamber and to delay the rearward travel of the block relative to said casing until the chamber approaches its rearmost position.

11. A rocket apparatus having, in combination, a casing, a combustion chamber longitudinally movable in said casing, said chamber having a breech block with means to support a cartridge thereon, means to lock said chamber and breech block during their forward travel relatively to said casing, means to unlock and relatively separate said block and chamber at the beginning of their rearward travel, means to supply a fresh cartridge to said breech block, and means to thereafter unite and lock said chamber and block.

12. A rocket apparatus having, in combination, a casing, a combustion chamber longitudinally movable in said casing, said chamber having a breech block, a cam fixed to said casing and effective to first unlock and to thereafter lock said breech block in said chamber, means to prevent rearward travel of the block with the chamber, and means to release the block as the chamber approaches its rearmost position.

13. A rocket apparatus having, in combination, a casing, a combustion chamber, a breech block normally locked in said chamber by sectional screw threads, means to unlock said breech block after the charge in the chamber is consumed, means to lock said breech block in said chamber after a new charge is inserted, and a spring effective to resist the unlocking and to assist the locking of said breech block, thereby equalizing the force available to unlock and lock the breech block.

14. A rocket apparatus having, in combination, a casing, a combustion chamber, a plurality of magazine tubes, and means to open a full tube when the tube in use becomes exhausted.

15. A rocket apparatus having, in combination, a primary rocket comprising a casing containing combustible material, a combustion chamber therein, means to successively introduce combustible material to said chamber, means on said casing for supporting a secondary rocket, and means for igniting the propelling charge in said secondary rocket when the combustible material in the primary rocket is exhausted.

16. A rocket apparatus having, in combination, a primary rocket comprising a casing containing combustible material, a combustion chamber therein, means to successively introduce combustible material to said chamber, a firing tube in said casing, means for supporting a secondary rocket on said casing and means for igniting the charge in said secondary rocket when the combustible material in the primary rocket is exhausted and for thereafter igniting the charge in the firing tube.

17. A rocket apparatus having, in combination, a primary rocket comprising a casing containing combustible material, a combustion chamber therein, means to successively introduce combustible material to said chamber, a firing tube in said casing, a chamber for explosives in said casing, means for supporting a secondary rocket on said casing, means for igniting the propelling charge in said secondary rocket when the combustible material in the primary rocket is ignited, means for thereafter igniting the charge in the firing tube, and means for finally igniting the explosive.

18. A rocket apparatus having, in combination, a casing, a combustion chamber, a magazine tube containing a pluarlity of cartridges, a secondary rocket supported on said casing, and means rendered operative on the complete exhaustion of the magazine tube for discharging said secondary rocket.

19. A rocket apparatus having, in combination, a casing, a combustion chamber, a firing tube in said chamber, and means rendered operative on the complete exhaustion of the magazine tube for igniting the charge in said firing tube.

20. A rocket apparatus having, in combination, a casing, a combustion chamber, an explosive charge in said casing, and means rendered operative on the complete exhaustion of the magazine tube for igniting said explosive.

In testimony whereof I have hereunto set my hand, in the presence of two subscribing witnesses.

ROBERT H. GODDARD.

Witnesses:
CHAS. T. HAWLEY,
C. FORREST WESSON.